(12) United States Patent
Byrne

(10) Patent No.: US 11,057,447 B2
(45) Date of Patent: Jul. 6, 2021

(54) UNIFORM PACKET STREAMING

(71) Applicant: T-Mobile USA, Inc., Bellevue, WA (US)

(72) Inventor: Cameron Byrne, Seattle, WA (US)

(73) Assignee: T-MOBILE USA, INC., Bellevue, WA (US)

(*) Notice: Subject to any disclaimer, the term of this patent is extended or adjusted under 35 U.S.C. 154(b) by 0 days.

(21) Appl. No.: 16/690,674

(22) Filed: Nov. 21, 2019

(65) Prior Publication Data
US 2021/0160295 A1    May 27, 2021

(51) Int. Cl.
G06F 15/16    (2006.01)
H04L 29/06    (2006.01)

(52) U.S. Cl.
CPC ...... H04L 65/4084 (2013.01); H04L 65/4076 (2013.01); H04L 69/164 (2013.01); H04L 69/165 (2013.01)

(58) Field of Classification Search
CPC .................................................. H04L 65/4084
See application file for complete search history.

(56) References Cited

U.S. PATENT DOCUMENTS

2010/0011103 A1* 1/2010 Luzzatti ............... H04N 21/632
                                                    709/226
2010/0158015 A1* 6/2010 Wu ......................... H04L 49/90
                                                    370/395.7
2013/0254634 A1* 9/2013 Luby ...................... H04L 65/00
                                                    714/776
2020/0204477 A1* 6/2020 Rahman .................. H04L 65/80

* cited by examiner

Primary Examiner — Yves Dalencourt
(74) Attorney, Agent, or Firm — Loeb & Loeb LLP

(57) ABSTRACT

A method and system for delivering content are disclosed. A media stream including media data is received from a content provider at a content delivery network (CDN) server. The CDN server creates a uniform protocol data unit (PDU) comprising the media data. A plurality of requests to receive the uniform PDU are received at the CDN server from a plurality of devices is received at a CDN server. Each device is associated with a unique IP address. The CDN server communicates the uniform PDU over a network to the plurality of devices using the unique IP address for each of the plurality of devices.

17 Claims, 3 Drawing Sheets

UNIFORM PACKET STREAMING

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When streaming media data such as a live video event or delivering uniform data packets of any type, the content delivery network scale can be a challenge. If the content is the same (e.g., users are all watching the same content or video), duplicate efforts in the packet formation can be removed and the server side delivery process can be streamlined.

SUMMARY

A method for delivering content is disclosed. A media stream including media data is received from a content provider at a content delivery network (CDN) server. The CDN server creates a uniform protocol data unit (PDU) including the media data. A plurality of requests to receive the uniform PDU are received at the CDN server from a plurality of user devices. Each user device is associated with a unique IP address. The CDN server communicates the uniform PDU over a network to the plurality of user devices using the unique IP address for each of the plurality of user devices.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
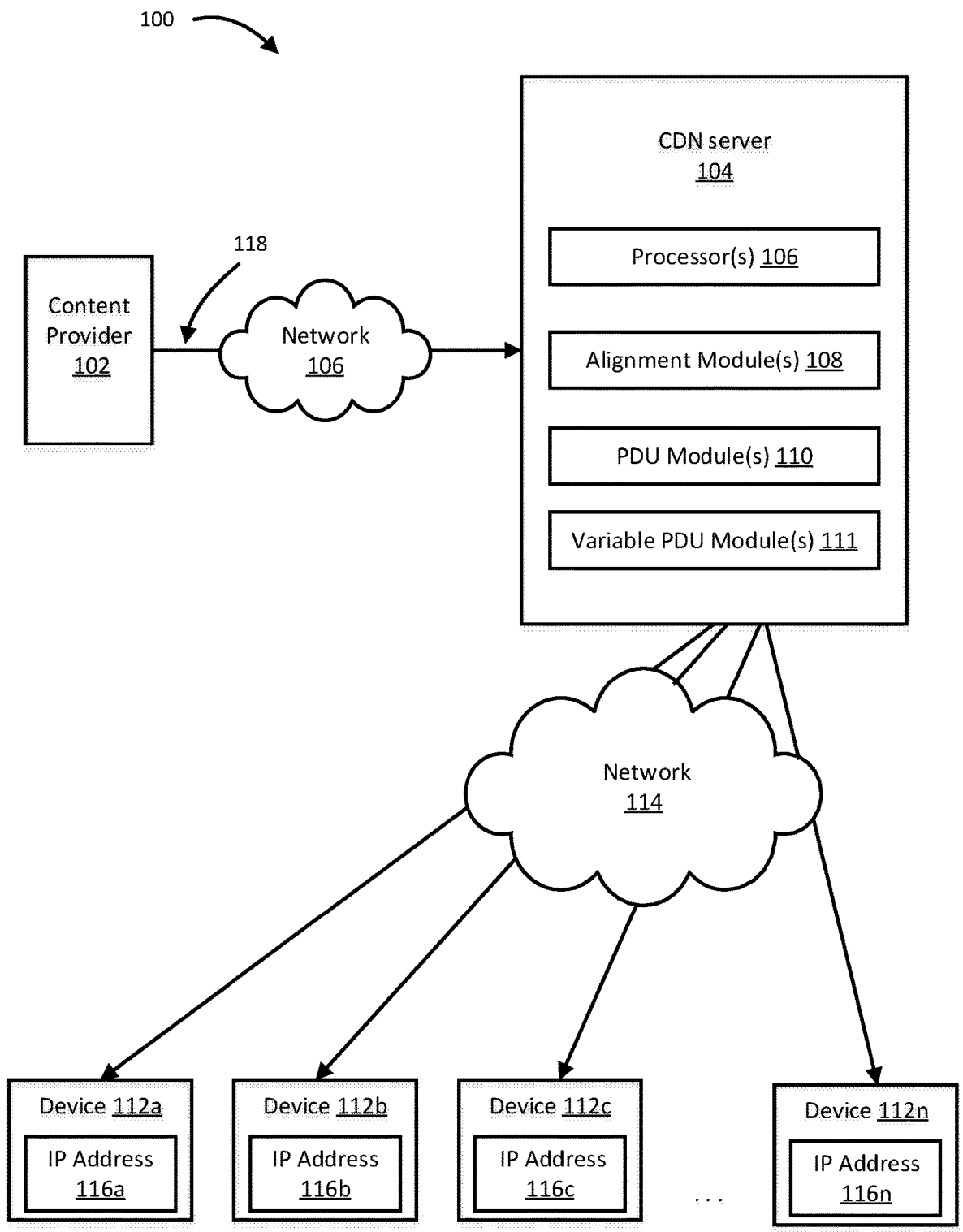
FIG. 1 is a schematic of an embodiment of a content delivery system in accordance with the current disclosure.

In computer networking, there are three main types of transmission methods to communicate or stream data: unicast, multicast, and broadcast. Each will be discussed in turn herein.

At a high-level, unicast refers to a one-to-one transmission of data from a single source to a single destination. In a unicast transmission, data packets stream from the single source to the single destination where a unique network address identifies the recipient; for example, from a web server to a client application, computer, or browser using the unique Internet Protocol (IP) address associated with the client. Though unicast transmission is one-to-one, the same information in the form of data packets may be passed from the sender to any number of destinations on the network. In order to do this, a copy of each data packet in the data stream must be made and then communicated to every destination on the network that requests it.

Unicast transmission is easier to implement than other transmission systems, such as multicast and broadcast, as unicast has been around for a long time and uses well-known protocols such as Transmission Control Protocol (TCP) and User Datagram Protocol (UDP). Unicast transmission is also the primary transmission system used on the Internet. However, because each unicast client that connects to a source (e.g., a server) uses up some network bandwidth, when multiple clients are involved, scaling becomes an issue for network and server resources. The problem becomes even more pronounced if many sources are transmitting via unicast to many receivers at the same time.

Multicast is a one-to-many transmission, e.g., from one source to multiple destinations that request the information. Multicast transmission depends on multicast enabled routers to forward data packets to all recipients requesting the data stream. Unlike unicast transmission, which communicates out separate copies of each data stream, a multicast enabled server communicates a single data stream that is directed by routers on the network to various recipients that have requested the stream. Because the source only communicates a single data stream regardless of the number or destinations requesting the data stream, there is no extra load on the server. The same load is experienced on the server whether a single recipient or multiple recipients request the data stream. In this way, redundant traffic over the network is eliminated resulting in enhanced efficiency for both the server and network. Although multicast transmission can save on bandwidth and works well in corporate environments where all routers are multicast enabled, multicast transmission does not work well with web servers, as only some portions of the Internet are multicast enabled.

Broadcast transmission is from one source to all possible destinations (e.g., one-to-all). In broadcast transmission, a single data stream from one sender is simultaneously routed to all destinations associated with the broadcast address whether the data is requested or not. Thus, all destinations on the network receive a common signal or message. This can lead to economies of scale, if the equipment and resources needed for copying, refreshing, and relaying the broadcast transmission to all destinations is available. Currently, the Internet is not broadcast enabled. However, even if the Internet was broadcast enabled, broadcast transmission is not well suited for the Internet as having every destination receive all broadcast transmissions all the time would introduce unnecessary load on the network and a massive amount of unwanted data.

As discussed above, multicast and broadcast transmission, while suitable for scaling, are not good options for the transmission of data over the Internet as the Internet is not currently set-up to accommodate these methods of transmission. Unicast on the other hand, is an easy and well-known method of transmitting data over the Internet, but lacks the ability to scale offered by multicast and broadcast. Therefore, there exists a need to be able to stream data over the Internet using well-known and established unicast protocols to many or all destinations that request the information, but in a streamline approach to enable scaling.

Although the descriptions below may be directed to an exemplary implementation incorporating a unicast system and protocols, the techniques described therein are applicable to other transmission systems and protocols that may require efficiencies in scaling.

FIG. 1 illustrates an exemplary content delivery system 100. The content delivery system 100 may comprise a content provider 102 that is in communication with a content delivery network (CDN) server 104 via a first network 106.

The first network 106 may comprise one or more routers and may be unicast, multicast, or broadcast enabled network or any other network that is capable of communicating data.

The CDN server 104 may comprise a single server or a network of servers. In one embodiment, the CDN server may include one or more processors 106, an alignment module 108, a PDU module 110, and/or a variable PDU module. The one or more processors 106 may be configured to execute computer executable instructions. The alignment module 108, PDU module 110, and the variable PDU module 111 may be configured to communicate with the processor(s) 106 and/or each other.

The CDN server 104 may support content delivery to one or more devices 112a, b, c, . . . , n (collectively, referred to as "devices 112") via a second network 114. The one or more devices 112 may be any computing device capable of requesting and receiving data. The one or more devices 112 may each be associated with a unique IP address 116a, b, c, . . . n (collectively referred to as "unique IP addresses 116"). The unique IP addresses 116 may be 64 bit or any other bit length that is suitable for uniquely identifying the device. The one or more devices 112a, b, c, n may also be associated with one or more subscribers or users.

The second network 114 may comprise one or more routers and may be unicast, multicast, or broadcast enabled or any other network that is capable of communicating data. The first and second networks 106, 114 may be part of the same overall network or may form separate networks.

The content provider 102 may communicate a data stream 118 to the CDN server 104 via the first network 106. The data stream 118 may include one or more data packets. The CDN server 104 may repackage or replicate the one or more data packets and communicate them to the one or more devices 116 via the second network 114. In an embodiment, the second network may be a unicast network. The one or more data packets may include media data, which may be for a live event or a pre-recorded event. The data stream 118 may also include other data such as website content.

Figure 2:
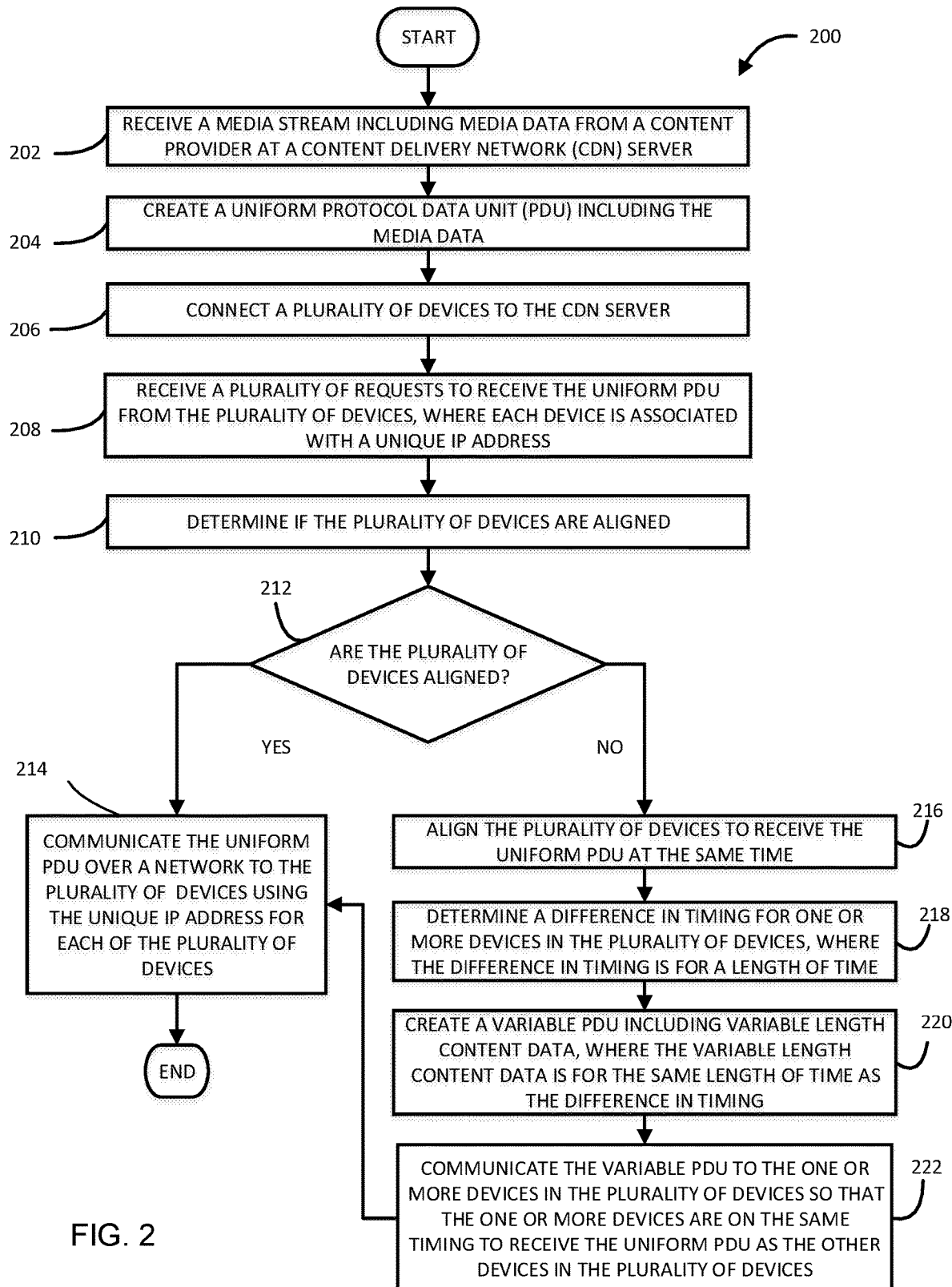
FIG. 2 is a flowchart of a method for delivering content in accordance with the current disclosure.

FIG. 2 is a flowchart of an exemplary method 200 for delivering content. At a block 202, a data stream (e.g., data stream 118), which may include but is not limited to, one or more data packets from a content provider (e.g., content provider 102) may be communicated to a CDN server (e.g., CDN server 104) via a network (e.g., first network 106 and/or second network 114). In one embodiment, the data packets may include media data or other data that may be uniformly distributed. In one embodiment, the network may be a unicast network, which may be TCP or UDP enabled, and the CDN server 104 may be a unicast server.

At a block 204, the one or more data packets may be received by the CDN server 104, which may create a uniform protocol data unit (PDU) via a PDU module (e.g., PDU module 110). In one embodiment, the uniform PDU may be a TCP segment. In another embodiment, the uniform PDU may be a UDP datagram.

The uniform PDU may include all or a portion of the data communicated by the content provider. In an embodiment, the data packets may contain media data and the PDU may contain all or a portion of the media data. At a high level, the CDN server 104 may attempt to create the PDU in a way that results in a uniform packet that may be quickly and efficient communicated over a variety of network profiles. For example, in one embodiment the lower level hardware and the Operating System (OS) abstractions, for example, Extended Berkeley Packet Filters, may be leveraged to efficiently distribute the uniform PDU to multiple unique destination IP addresses. In another embodiment, higher level OS abstractions, for example, HTTP WebSocket and WebRTC, may be used to create and distribute the uniform PDU.

At a block 206, a plurality of devices (e.g., devices 112a, b, c, n), which may be associated with one or more subscribers or users, may connect to the CDN server. The plurality of devices 112 may be a computing device such as, but not limited to, any of a router, server, smart phone, laptop, television, tablet, or personal computer, for example. The plurality of devices may each be associated with a unique IP address (e.g., IP addresses 116a, b, c, n).

At a block 208, a plurality of requests to receive the uniform PDU may be communicated from the plurality of devices to the CDN server 104 via the network. The plurality of devices 112 may communicate with the CDN server using TCP or UDP and vice versa.

At a block 210, whether the plurality of devices 112 are aligned may be determined by the CDN server 104. The plurality of devices 112 are aligned if they are all on the same timing, e.g., the request to receive the data stream are all received at the same time. If at a block 212, the plurality of devices 112 are aligned, then the CDN server may communicate the uniform PDU over the network to the plurality of devices 112 using the unique IP address for each of the plurality of devices at a block 214.

If at a block 212, the plurality of devices 112 are not aligned, then the method continues to a block 216. At a block 216, the plurality of devices 112 may be aligned by the CDN server 104 via an alignment module (e.g., alignment module 108) so that they receive the uniform PDU at the same time.

At a block 218, a difference in timing for one or more devices in the plurality of devices 112 may be determined by the CDN server 104 via the alignment module 108. The difference in timing may be for a length of time (e.g., 1 second, 30 seconds, 1 minute, etc.). The difference in timing may be calculated as the time between when the CDN server 104 first receives the data stream from the content provider 102 or the PDU module first creates the uniform PDU and when a request from a device in the plurality of devices (e.g., 112a) is received by the CDN server 104. The difference in time may also be calculated as the time between when a first request from a device in the plurality of devices (e.g., 112a) is received by the CDN server 104 and the time at which the second, third, fourth etc. request is received by the CDN server 104 from other devices in the plurality of devices (e.g., 112b, c, n). The difference in timing may be unique for each device or the same for one or more devices in the plurality of devices.

At a block 220, one or more variable PDUs comprising variable length content data may be created by the CDN server 104 via a variable PDU module (e.g., Variable PDU module 111). The variable length content data may be for the same length of time as the difference in timing calculated by the alignment module 108 for each device.

At a block 222, the one or more variable PDUs may be communicated by the CDN server 104 to the one or more devices in the plurality of devices so that the one or more devices 112 are on the same timing to receive the uniform PDU as the other devices in the plurality of devices.

Once the one or more variable PDUs are communicated such that all the devices in the plurality of devices 112 requesting the uniform PDU are aligned, the method proceeds to block 214 where the uniform PDU is communicated to all the devices 112 that have requested the uniform PDU.

The current method and systems disclosed herein are beneficial to both server and network resources and users or subscribers. By aligning all the devices in the plurality of device so that they are all on the same timing, the CDN server 104 may communicate one copy of the uniform PDU to each device that requests the information over the unicast network rather than having to duplicate the uniform PDU at various times to accommodate devices that have requested the uniform PDU at time that is later than the first requester, thereby reducing redundancies and load on the CDN server.

In addition, because the variable PDUs are for a short period of time (e.g., a few seconds or minutes) and not the full length of the uniform PDU, creating and communicating the variable PDUs to those devices that are out of alignment takes up less server resources and network bandwidth than duplicating the uniform PDU and communicating it at different times. In addition, for the streaming of media for an event such as a live event, it is important that all devices receive the uniform PDU at the same time so that users associated with any of the devices in the plurality of devices have the same experience as other users.

Figure 3:
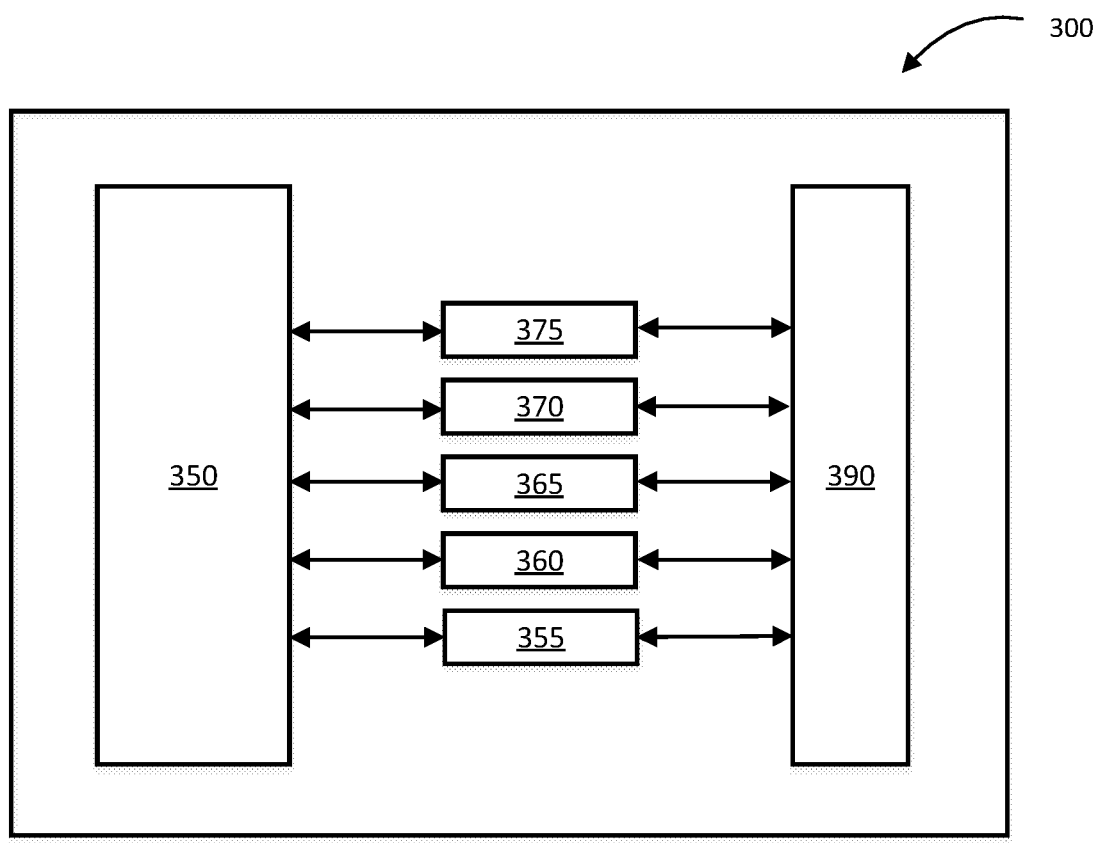
FIG. 3 is a schematic of an exemplary device in accordance with the current disclosure.

FIG. 3 may be an example computing device 300, for example, devices 112 or CDN server 104. The computing device 300 may be physically configured to interact or communicate with other computing devices via a communication network. The computing device 300 may have a processor 350 (e.g., processor(s) 106) that is physically configured according to computer executable instructions. The computing device 300 may have a power supply 355 such as a battery which may be rechargeable. The computing device 300 may also have a sound and video module 360 which assists in displaying video and sound and may turn off when not in use to conserve power and battery life. The computing device 300 may also have volatile memory 365 and non-volatile memory 370 as well as internal storage 375 or external storage. The computing device 300 may have an input/output bus 390 that shuttles data to and from various user input devices such as a keyboard, mouse, speakers, or other inputs. It also may control communicating with other computing devices and system components, either through wireless or wired devices. Of course, this is just one embodiment of the computing device 300 and the number and types of computing devices 300 is limited only by the imagination.

In accordance with the provisions of the patent statutes and jurisprudence, exemplary configurations described above are considered to represent one embodiment of the disclosure. However, it should be noted that the teachings of the disclosure can be practiced otherwise than as specifically illustrated and described without departing from its spirit or scope.

The computing devices, computers, routers, and servers described herein may be computers that may have, among other elements, a microprocessor (such as from the Intel Corporation, AMD or Motorola); volatile and non-volatile memory; one or more mass storage devices (e.g., a hard drive); various user input devices, such as a mouse, a keyboard, or a microphone; and a video display system. The user computing devices, computers, and servers described herein may be running on any one of many operating systems including, but not limited to WINDOWS, UNIX, LINUX, MAC OS, or Windows (XP, VISTA, etc.). It is contemplated, however, that any suitable operating system may be used for the present disclosure. The servers may be a cluster of web servers, which may each be LINUX based and supported by a load balancer that decides which of the cluster of web servers should process a request based upon the current request-load of the available server(s).

The computing devices, computers, routers, and servers described herein may communicate via communications networks, including the Internet, WAN, LAN, Wi-Fi, cellular, or other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, point of sale terminals, computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present disclosure as described above can be implemented in the form of control logic using computer software in a modular or integrated manner. Based on the disclosure and teachings provided herein, a person of ordinary skill in the art may know and appreciate other ways and/or methods to implement the present disclosure using hardware, software, or a combination of hardware and software.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow diagram, a narrative, and/or in any other manner that provides sufficient structure for those of ordinary skill in the art to implement the recited process and its equivalents.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment. One or more features from any embodiment may be combined with one or more features of any other embodiment without departing from the scope of the disclosure. A recitation of "a", "an" or "the" is intended to mean "one or more" unless specifically indicated to the contrary. Recitation of "and/or" is intended to represent the most inclusive sense of the term unless specifically indicated to the contrary.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method for delivering content, the method comprising:
   receiving a media stream from a content provider at a content delivery network (CDN) server, the media stream comprising media data;
   creating, via the CDN server, a uniform protocol data unit (PDU) comprising the media data;
   receiving, via the CDN server, a plurality of requests to receive the uniform PDU from a plurality of devices, wherein each device is associated with a unique IP address;
   connecting the plurality of devices to the CDN server;
   aligning, via the CDN server, the plurality of devices so that they receive the uniform PDU at the same time; and,
   communicating, via the CDN server, the uniform PDU over a network to the plurality of devices using the unique IP address for each of the plurality of devices.

2. The method of claim 1, wherein the media stream is for a live event.

3. The method of claim 1, wherein each of the plurality of devices are any of a mobile phone, lap top, television, tablet, or personal computer.

4. The method of claim 1, wherein the network is a unicast network.

5. The method of claim 4, wherein the CDN server is a unicast server.

6. The method of claim 1, wherein the uniform PDU is a Transmission Control Protocol (TCP) segment.

7. The method of claim 1, wherein the uniform PDU is a User Datagram Protocol (UDP) datagram.

8. The method of claim 1, wherein the plurality of devices communicate with the CDN server using TCP.

9. The method of claim 1, wherein the plurality of devices communicate with the CDN server using UDP.

10. The method of claim 1, further comprising:
    determining if the plurality of devices are aligned.

11. The method of claim 1, wherein aligning the plurality of devices, further comprises:
    determining, via the CDN server, a difference in timing for one or more devices in the plurality of devices, wherein the difference in timing is for a length of time;
    creating, via the CDN server, a variable PDU comprising variable length content data, wherein the variable length content data is for the same length of time as the difference in timing; and,
    communicating, via the CDN server, the variable PDU to the one or more devices in the plurality of devices so that the one or more devices are on the same timing to receive the uniform PDU as other devices in the plurality of devices.

12. A processor-readable tangible non-transitory medium storing processor-issuable instructions configured to cause a processor to:
    receive a media stream from a content provider at a content delivery network (CDN) server, the media stream comprising media data;
    create, via the CDN server, a uniform protocol data unit (PDU) comprising the media data;
    receive, via the CDN server, a plurality of requests to receive the uniform PDU from a plurality of devices, wherein each device is associated with a unique IP address;
    connect the plurality of devices to the CDN server;
    align, via the CDN server, the plurality of devices so that they receive the uniform PDU at the same time; and,
    communicate, via the CDN server, the uniform PDU over a network to the plurality of devices using the unique IP address for each of the plurality of devices.

13. The processor-readable tangible non-transitory medium of claim 12, wherein the media stream is for a live event.

14. The processor-readable tangible non-transitory medium of claim 12, wherein the network is a unicast network.

15. A system for delivering content, the system comprising:
- a network; and
- a content delivery network (CDN) server in communication with the network;
- wherein the CDN server is configured to:
    - receive a media stream from a content provider, the media stream comprising media data;
    - create a uniform protocol data unit (PDU) comprising the media data;
    - receive a plurality of requests to receive the uniform PDU from a plurality of devices, wherein each device is associated with a unique IP address;
    - connect the plurality of devices to the CDN server;
    - align the plurality of devices so that they receive the uniform PDU at the same time; and,
    - communicate the uniform PDU over the network to the plurality of devices using the unique IP address for each of the plurality of devices.

16. The system of claim 15, wherein the media stream is for a live event.

17. The system of claim 15, wherein the network is a unicast network.

* * * * *